(12) United States Patent
Rick et al.

(10) Patent No.: US 10,161,770 B2
(45) Date of Patent: Dec. 25, 2018

(54) FLOW METER WITH ADAPTABLE BEAM CHARACTERISTICS

(71) Applicant: OTT Hydromet GmbH, Kempten (DE)

(72) Inventors: David L. Rick, Longmont, CO (US); Martin Kennerknecht, Immenstadt (DE); Stefan Siedschlag, Berlin (DE); Fabian Kratz, Kaufbeuren (DE); Leon Audergon, Oberbueren (CH)

(73) Assignee: OTT Hydromet GmbH, Kempten (DE)

( * ) Notice: Subject to any disclaimer, the term of this patent is extended or adjusted under 35 U.S.C. 154(b) by 177 days.

(21) Appl. No.: 15/199,465

(22) Filed: Jun. 30, 2016

(65) Prior Publication Data
US 2018/0003531 A1    Jan. 4, 2018

(51) Int. Cl.
*G01F 1/00* (2006.01)
*G01F 1/66* (2006.01)
(Continued)

(52) U.S. Cl.
CPC ........... *G01F 1/002* (2013.01); *G01C 13/002* (2013.01); *G01F 1/66* (2013.01); *G01F 1/663* (2013.01);
(Continued)

(58) Field of Classification Search
CPC ..................................................... G01F 1/002
See application file for complete search history.

(56) References Cited

U.S. PATENT DOCUMENTS 4,062,237 A    12/1977 Fox
5,311,781 A *  5/1994 Gates ...................... G01F 1/002
                                                 73/861.18
(Continued)

FOREIGN PATENT DOCUMENTS

CN    101936756 A    1/2011
CN    102680977 A    9/2012
(Continued)

OTHER PUBLICATIONS

Godley, Andrew, "Flow measurement in partially filled closed conduits", Flow Measurement and Instrumentation, Dec. 2002, vol. 13, Issues 5-6, pp. 197-201, Elsevier.
(Continued)

*Primary Examiner* — Manuel L Barbee
*Assistant Examiner* — Raymond Nimox
(74) *Attorney, Agent, or Firm* — Ference & Associates LLC

(57) ABSTRACT

An embodiment provides a device for measuring a fluid parameter of fluid flow in a channel, including: a transmitter; at least one receiver; a processor operatively coupled to the at least one transmitter and the at least one receiver; a memory device that stores instructions executable by the processor to: transmit, using the transmitter, directed energy carrying a signal toward a surface of a fluid in a fluid channel, so as to produce one or more reflections from the fluid surface; detect, by the at least one receiver, one or more received signals associated with the one or more reflections so produced; determine, based upon a measurement beam comprising characteristics of the transmitted and received signals, one or more fluid parameters to be measured using a processor of the device; and associate, using a processor of the device, the one or more fluid parameters with a channel segment. Other embodiments are described and claimed.

21 Claims, 12 Drawing Sheets

(51) Int. Cl.
*G01F 15/06* (2006.01)
*G01F 15/075* (2006.01)
*G01S 13/58* (2006.01)
*G01C 13/00* (2006.01)
*G01P 5/00* (2006.01)

(52) U.S. Cl.
CPC .......... *G01F 15/063* (2013.01); *G01F 15/075* (2013.01); *G01P 5/00* (2013.01); *G01S 13/589* (2013.01)

(56) References Cited

U.S. PATENT DOCUMENTS

| | | | |
|---|---|---|---|
| 5,315,880 | A | 5/1994 | Bailey |
| 5,454,372 | A | 10/1995 | Banjanin et al. |
| 5,467,650 | A | 11/1995 | Cushing |
| 5,515,721 | A | 5/1996 | Kim et al. |
| 5,522,393 | A | 6/1996 | Phillips et al. |
| 5,531,125 | A | 7/1996 | Ahn et al. |
| 5,564,424 | A | 10/1996 | Yao |
| 5,623,930 | A | 4/1997 | Wright et al. |
| 5,684,250 | A | 11/1997 | Marsh et al. |
| 5,726,358 | A | 3/1998 | Koelling |
| 5,734,111 | A | 3/1998 | Hak Soo |
| 5,780,747 | A | 7/1998 | Soo |
| 5,811,688 | A | 9/1998 | Marsh et al. |
| 5,821,427 | A | 10/1998 | Byrd |
| 5,952,583 | A | 9/1999 | Chang |
| 6,535,835 | B1 | 3/2003 | Rubin et al. |
| 6,545,286 | B1 | 4/2003 | Ross et al. |
| 6,647,804 | B1 | 11/2003 | Deines |
| 7,539,082 | B2 | 5/2009 | Vogt |
| 7,542,374 | B2 * | 6/2009 | Brumley ................. G01P 5/241 367/90 |
| 7,839,720 | B2 | 11/2010 | Brumley et al. |
| 7,847,925 | B2 | 12/2010 | Vogt |
| 8,215,183 | B2 | 7/2012 | Petroff |
| 8,339,584 | B2 | 12/2012 | Christian et al. |
| 8,434,371 | B2 | 5/2013 | Marsh |
| 9,529,082 | B1 * | 12/2016 | Rikoski ............... G01S 7/52003 |
| 2002/0101373 | A1 * | 8/2002 | Arndt .................... G01F 23/284 342/124 |
| 2011/0000311 | A1 | 1/2011 | Petroff |
| 2011/0239781 | A1 * | 10/2011 | Petroff .................... G01F 1/002 73/861.28 |
| 2013/0000416 | A1 | 1/2013 | Croft et al. |
| 2013/0041599 | A1 * | 2/2013 | Rick ....................... G01F 1/002 702/45 |
| 2013/0041600 | A1 | 2/2013 | Rick |
| 2013/0345994 | A1 | 12/2013 | Wiklund et al. |
| 2014/0202240 | A1 | 7/2014 | Skinner et al. |
| 2014/0230567 | A1 * | 8/2014 | Rowe ...................... G01F 1/667 73/861.25 |
| 2015/0007654 | A1 | 1/2015 | Fehrenbach et al. |
| 2015/0007655 | A1 | 1/2015 | Skowaisa |
| 2015/0020608 | A1 | 1/2015 | Chevrier et al. |
| 2016/0138950 | A1 | 5/2016 | Sevar |
| 2018/0003533 | A1 * | 1/2018 | Rick ......................... G01F 1/66 |
| 2018/0003535 | A1 * | 1/2018 | Rick ......................... G01F 1/66 |

FOREIGN PATENT DOCUMENTS

| | | |
|---|---|---|
| CN | 202836680 U | 3/2013 |
| DE | 3223393 A1 | 12/1983 |
| DE | 4016529 C1 | 11/1991 |
| DE | 4228977 A1 | 3/1994 |
| DE | 10134264 A1 | 2/2003 |
| EP | 0550735 A1 | 7/1993 |
| GB | 2376740 A | 12/2002 |
| GB | 2393783 A | 4/2004 |
| JP | 2011122831 A | 6/2011 |
| WO | WO2001051897 A1 | 7/2001 |
| WO | WO2008039948 A2 | 4/2008 |
| WO | WO2010057480 A2 | 5/2010 |

OTHER PUBLICATIONS

Larrarte, Frederique, "Velocity fields within sewers: An experimental study", Flow Measurement and Instrumentation, Oct. 2006, vol. 17, Issue 5, pp. 282-290, Elsevier.

Teague, Calvin C. et al., "Canal and river tests of a RiverSonde streamflow measurement system", IEEE 2001 International Geoscience and Remote Sensing Symposium (IGARSS '01), Jul. 9-13, 2001, Sydney, NSW, 3 pages, IEEE Digital Library.

Fulton, John et al., "Measuring real-time streamflow using emerging technologies: Radar, hydroacoustics, and the probability concept", Journal of Hydrology, Jul. 30, 2008, vol. 357, Issues 1-2, pp. 1-10, Elsevier.

Kouyi, G.L. et al., "Use of cfd technique to optimize flowmeters location in sewers", Definition of methods for optimal microlocation of sensors in sewers, Dec. 20, 2011, 66 pages, European Commission Report, Prepared 2011.031, Copy available at: http://www.prepared-fp7.eu/viewer/file.aspx?fileinfoID=203.

R. Mohn et al., "Influence of Pipe-Junctions on Downstream Measuring Sections, predicted by a numerical model," NOVATECH 2010, 10 pages, Copy available at: http://documents.irevues.inist.fr/bitstream/handle/2042/35751/22507-212MOH.pdf.

International Search Report and Written Opinion, dated Dec. 7, 2017, pp. 11.

* cited by examiner

FLOW METER WITH ADAPTABLE BEAM CHARACTERISTICS

BACKGROUND

Estimating the volumetric flow of rivers and streams is an important problem in resource management and flood control. One may survey the cross-channel bed depth to develop a cross-sectional profile, which is then divided into sections. Water velocities within each section are then sampled at multiple depths using a submersible velocity probe. In this way, the channel cross-section is divided into smaller areas, each of which is associated with a measured velocity. From this painstakingly collected data set, a total volumetric flow rate may be computed.

Collection of the required multi-point data is, at best, a time-consuming and costly process and, during conditions such as flooding, quite hazardous. Consequently, daily or hourly estimates often depend on measuring a single parameter such as river stage (e.g., a single-point water level) and correlating that with a rating curve developed through more rigorous measurements over time.

One cannot, in general, extrapolate the entire rating curve from a single river survey because the curve's slope depends on which hydrodynamic controls govern the river behavior at various water levels. For example, high water may cause some rocks or sand bars to become submerged, thus allowing significant changes in flow patterns. This means that the correct rating curve shape is often unknown at a particular stage, e.g., flood stage, and there is value in discharge estimation methods that do not depend on knowing the rating curve.

One method involves entropic flow modeling. This method provides an estimate of the cross-sectional average velocity that depends on the present maximum velocity and on a previously determined coefficient which is nearly independent of river stage. According to entropic flow modeling theory there is a site-dependent proportionality between the maximum velocity and the cross-sectional average velocity. In wide channels, the maximum velocity often occurs at the water surface, typically near the center of the channel.

If the river bed and bank shapes have been previously surveyed, then the relationship between water height and cross-sectional flow area is also known. It thus becomes possible to calculate discharge as average velocity multiplied by cross-sectional area, based only on two measurements: the water height and the maximum velocity. Moreover, water height and maximum surface velocity are measureable from a distance by so-called non-contact sensors. Examples of non-contact measurement sensors are ultrasonic distance sensors for water level and Doppler radar sensors for surface velocity. Non-contact level and velocity sensors are often mounted from bridges spanning the river or stream of interest. These sensors allow river or stream discharge to be estimated during flood stage at little risk to personnel because nothing needs to be put into the water.

An alternative method for measuring water height is a submerged pressure sensor, whose output will vary with its depth of submersion. An alternative for measuring velocity is a permanently installed ultrasonic current meter, typically mounted below the water line on a bridge pylon. Submerged sensors such as these require more frequent maintenance and are susceptible to damage during flood events. This is why non-contact sensors are preferable.

Some Ultrasonic level sensors are available, and some models are intended specifically for measuring river stage.

BRIEF SUMMARY

One embodiment provides a device for measuring a fluid parameter of fluid flow in a channel, comprising: a transmitter; at least one receiver; a processor operatively coupled to the at least one transmitter and the at least one receiver; a memory device that stores instructions executable by the processor to: transmit, using the transmitter, directed energy carrying a signal toward a surface of a fluid in a fluid channel, so as to produce one or more reflections from the fluid surface; detect, by the at least one receiver, one or more received signals associated with the one or more reflections so produced; and determine, based upon a measurement beam comprising characteristics of the transmitted and received signals, one or more fluid parameters to be measured using a processor of the device; and associate, using a processor of the device, the one or more fluid parameters with a channel segment.

Another embodiment provides a device for measuring a fluid parameter of fluid flow in a channel, comprising: a transmitter; at least one receiver; a processor operatively coupled to the at least one transmitter and the at least one receiver; a memory device that stores instructions executable by the processor to: transmit, using the transmitter, directed energy carrying a signal toward a surface of a fluid in a fluid channel, so as to produce one or more reflections from the fluid surface; detect, by the at least one receiver, one or more received signals associated with the one or more reflections so produced; determine, based upon a measurement beam comprising characteristics of the transmitted and received signals, one or more fluid parameters to be measured using a processor of the device; and associate, using a processor of the device, the one or more fluid parameters with a channel segment.

A further embodiment provides a product for measuring velocity of fluid flow in a channel, comprising: a storage device having code stored therewith, the code being executable by a processor and comprising: code that transmits, using a transmitter, directed energy carrying a signal toward a surface of a fluid in a fluid channel, so as to produce one or more reflections from the fluid surface; code that detects, by at least one receiver, one or more received signals associated with the one or more reflections so produced; code that determines, based upon a measurement beam comprising characteristics of the transmitted and received signals, one or more fluid parameters to be measured using a processor of a device; and code that associates, using a processor of the device, the one or more fluid parameters with a channel segment.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
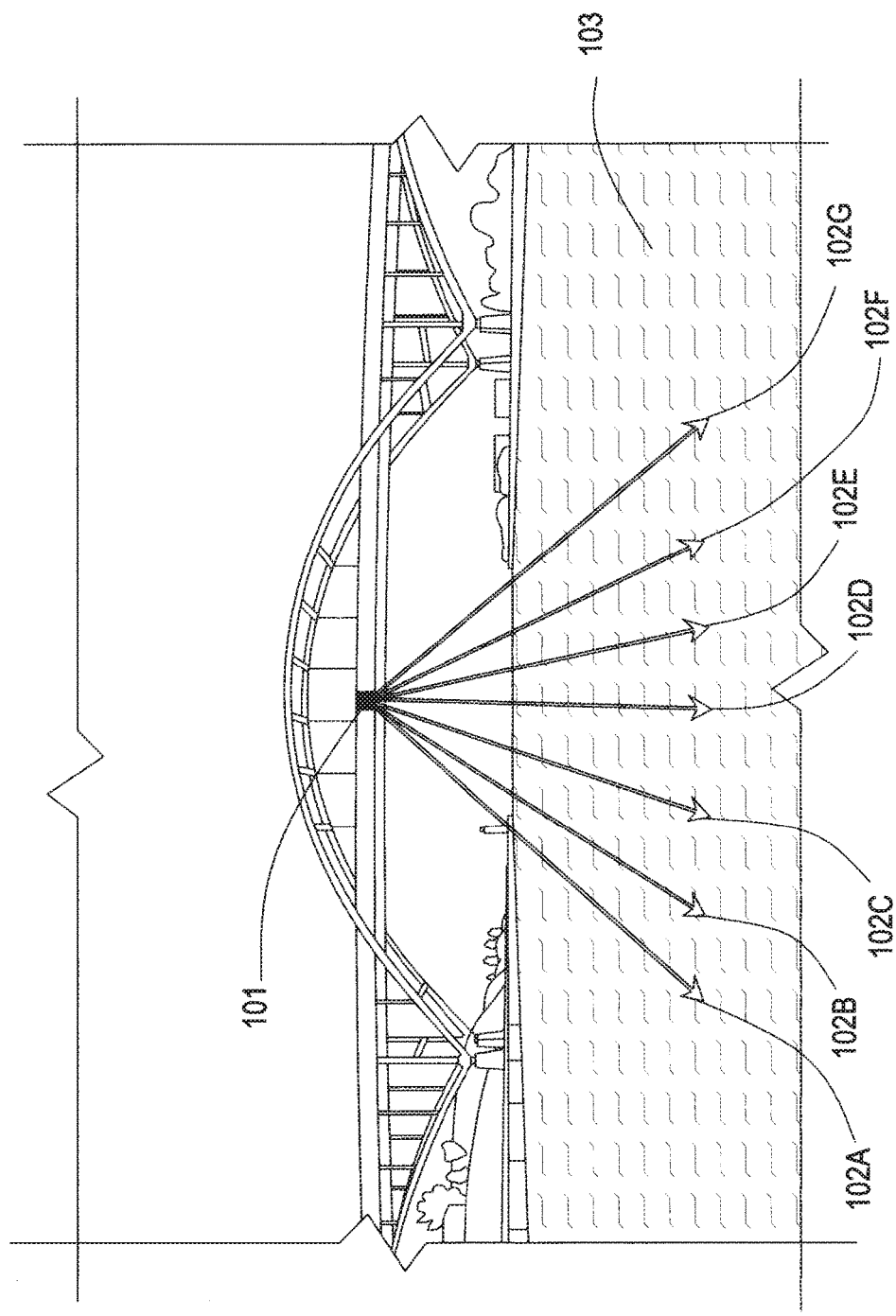
FIG. 1 illustrates a cross sectional view of a fluid flow meter measuring multiple surface velocities of a fluid in an open channel.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A drawback in non-contact or surface measurement techniques is that the measurement of surface velocity does not necessarily represent the mean velocity of the fluid being measured. This is true because fluid velocities vary across the width of the channel, and also from surface to channel bottom the velocity distribution is variable, depending upon channel slope, friction, fluid characteristics, and the flow conditions upstream and downstream of the measurement location.

Measurement of volumetric flow (Q) in an open channel context where a fluid conduit has a defined cross-section are based on the area-velocity concept:

$$Q=VA,$$

where A is the area of a filled channel cross-section, and V is the average fluid velocity through that area, also known as the cross-sectional average velocity.

The surface velocity measurable using for example a radar beam or an ultrasonic beam is generally not the same as the true cross-sectional average velocity, V, i.e., that which is needed to accurately compute volumetric flow. The measured surface velocity must be modified according to some algorithm in order to obtain an estimate of cross-sectional average velocity. The need to estimate a cross-sectional average velocity from velocity observations within a centrally-disposed surface patch, where a radar beam or other measurement beam intersects the water surface, is a source of potential error.

Typically, installers of existing non-contact sensors use a manual velocity profiling method, such as a pole-mounted point-velocity sensor, to "profile" the channel and develop a site-specific correction which is subsequently applied to readings from a non-contact velocity sensor measuring surface velocity at a single point or localized patch. It is questionable whether a simple correction factor derived at installation time is adequate for use over time and under a variety of flow conditions encompassing varying fluid heights and changing channel conditions.

According to entropic flow modeling theory there is a site-dependent proportionality between the maximum velocity and the cross-sectional average velocity. In wide channels, the maximum velocity often occurs at the water surface, typically near the center of the channel. To apply entropic flow modeling theory without additional uncertainty, one should take care to actually measure the maximum velocity. This is generally measurable at the water surface near the center of the channel, but variations in channel shape may cause it to move off-center. Thus, proper deployment of a radar velocity sensor may require characterizing the surface velocity over a significant fraction of channel width so that a radar beam can be aimed at the correct position.

This initial characterization can be costly and time-consuming. Moreover, because the river or stream's hydrodynamic controls may vary with stage or over time, there remains a worry that the radar velocity sensor will not be aimed properly during a flood event and the true maximum velocity will not be measured. Failure to measure the true maximum velocity value is a source of uncertainty in the reported discharge.

Accordingly, an embodiment provides a radar velocity sensor that can search for and measure the true velocity maximum, both at installation time and during subsequent use. In an embodiment, the sensor will be hung from a bridge or truss spanning the waterway or channel; therefore, for ease of installation, the sensor package provided by an embodiment is small and light enough to be carried and positioned by a single person.

One refinement of entropic flow modeling methodology is to divide the channel width into segments, similar to the segments used for numerical velocity integration, and velocities within each segment are modeled with a entropic flow modeling-type equation. To apply this methodology, it is necessary to measure velocities at a number of points spanning the channel width. An embodiment utilizes a plurality of velocity measurements spanning an open channel and thus permits this technique to be employed using a non-contact sensor.

Accordingly, an embodiment provides a radar velocity sensor that can measure at multiple points across the width of a river or stream. In an embodiment, these points span a significant portion of the channel width. A radar velocity sensor according to an embodiment can measure at multiple locations spanning some significant portion of the channel width that provides a valuable improvement in discharge estimation.

In an embodiment, finding a maximal or peak velocity is facilitated via use of multiple measurement points. In general, the most important region to measure in an open channel is the central part because that is where the peak velocity will most likely be observed. However, an embodiment permits an automated determination of the location of the peak velocity within the open channel.

Measurement of surface velocity at multiple points also enables application of a pre-existing rating curves in non-traditional conditions, e.g., application of rating curves to high water conditions. For example, an embodiment permits a constant-slope extrapolation of the existing curve if it is possible to validate it, e.g., by confirming with the described embodiments that the general shape of the surface velocity distribution is similar to that observed when the rating curve was originally determined. Conversely, if the cross-channel velocity distribution has a significantly different shape, the rating curve slope may be adjusted according to an embodiment.

Another embodiment provides a sensor that may be deployed using an unmanned aerial vehicle (UAV) or drone, e.g., in order to suspend or position the fluid flow meter (and attendant sensor(s)) over a remote or otherwise inaccessible stretch of water. Clearly, sensor size and weight must be minimized in such an application, not only because of UAV payload limitations, but also because the entire equipment package may need to be carried long distances to reach a remote study site.

For UAV applications, there may be strict limits on the time spent aloft, which makes an embodiment comprising a sensor capable of simultaneously measuring multiple points especially attractive. An embodiment is also able to adjust the beam orientations and beam widths in order to permit the measurement points to span a significant width of the channel under study. An embodiment utilizes beam characteristics that are capable of real-time modification, e.g., in response to data from an altimeter or vertical distance sensor.

To enable Doppler velocity measurements, an embodiment provides a radar beam that impinges upon the water surface at an acute angle. By way of example, an embodiment may employ elevation angles between 20 and 50 degrees from the water surface. These deployment angle(s) utilized are known (or determinable) in order to compute correct stream-wise velocity values. In an embodiment, the sensor incorporates a tilt measurement feature and automatically adjusts the reported velocities on the basis thereof.

For radar velocity measurements, a further restriction is that the water surface must not be perfectly smooth or no radar energy will be reflected back to the sensor. The scale of surface roughness required depends on the wavelength of the radar signal: radars with wavelengths smaller than 0.1 meter can function with smaller-scale surface roughness than can VHF or UHF radars. The longer-wavelength radars typically require the existence of surface disturbances such as may be caused by wind; they may function poorly under calm conditions.

Accordingly, an embodiment utilizes a radar sensor capable of functioning under relatively smooth water surface conditions, e.g., an embodiment utilizes radar wavelengths significantly shorter than 0.1 meter. For example, a radar carrier frequency of 24 GHz is associated with a wavelength of 12.5 mm, which yields good results in many circumstances. Furthermore, an embodiment provides a sensor package that uses a higher carrier frequency, such as 24 GHz, to aid in reducing the sensor package size and weight because a multi-element directional antenna operating at shorter electromagnetic wavelengths can be made correspondingly smaller.

A sensor capable of measuring surface velocity at multiple locations across the width of a channel has the potential to allow better estimation of cross-sectional average velocity. An embodiment therefore provides for and uses a multiplicity of measured surface velocities to obtain an estimate of the cross-sectional average velocity.

An embodiment also changes, adjusts, or steers the beam(s) in order to measure different positions or widths based on a level of the fluid within the channel.

The illustrated example embodiments will be best understood by reference to the figures. The following description is intended only by way of example, and simply illustrates certain example embodiments.

In FIG. 1 there is illustrated a fluid flow meter 101 positioned to measure flow of a fluid 103 in a fluid channel. The views shown in FIG. 8(A-B) illustrate that the fluid 103 often flows through a fluid channel with varying velocities. For example, the fluid 103 typically flows at different speeds at various parts of the fluid channel, with the edges of the fluid 103 proximate to the edge of the channel (sides and bottom) flowing more slowly.

As may be appreciated, taking a singular measurement (e.g., using only a single measurement beam) may not yield a particularly accurate or representative velocity estimate, e.g., useful in terms of measuring fluid flow. Thus, an embodiment provides a fluid flow meter 101 that measures flow of the fluid 103 within the channel by measuring a plurality of surface points. By way of example, as illustrated in FIG. 1, an embodiment utilizes a plurality of beams 102a, 102b, 102c, 102d, 102e, 102f and 102g in order to obtain velocity measurements at different points of the fluid 103. As will be apparent from the description herein, more or fewer beams than those illustrated in FIG. 1 may be utilized. The number of beams may vary, for example, based on the width of the fluid channel, the height of the flow meter 101, the distance between the flow meter (or component thereof, e.g., transducer and/or receiver) and the fluid surface (e.g., for a mobile flow meter that varies in height above the fluid channel), the type of beam(s) utilized, and/or the fluid level within the fluid channel.

Illustrated in FIG. 1 is an example implementation of a fluid flow meter 101 according to an embodiment. The fluid flow meter 101 provides a fluid flow measurement based on a plurality of beams 102a-102g, where the beam characteristics permit measuring velocity at a multiplicity of locations on the fluid surface 103; the beams 102a-102g substantially span the width of a fluid channel.

The flow meter 101 may include a radar-based sensor or transducer capable of transmitting and receiving the plurality of beams 102a-102g used for measuring surface velocity of the fluid 103 (e.g., water) at a multiplicity of locations substantially spanning the width of an open channel. The radar-based sensor of the fluid flow meter 101 may achieve measurements of velocity at multiple points by steering a single radar beam to multiple points on the fluid 103 surface, by switching among several beams having fixed orientations in terms of the fluid 103 surface, or a suitable combination of the foregoing. The flow meter 101 may employ a single transmit/receive antenna (or array) or may use one or more dedicated transmit antennas (or arrays) and one or more dedicated receiver antennas (or arrays).

In a flow meter 101 employing distinct transmit and receive antennas, the steering or switching may be applicable only to receive antennas, only to transmit antennas, or to both. When only one of receive antenna(s) or transmit antenna(s) is steered or switched, the other may employ a wide beam shape capable of substantially spanning the channel without re-direction. While transmit and receive beams may have distinct radiation/reception patterns, it is sometimes useful to consider an effective beam pattern for a round-trip path of energy propagating from a transmitting antenna to a target and returning to a receiving antenna. This effective beam pattern for a round-trip path of energy is referred to as a "measurement beam" governed by the combined characteristics of the transmit and receive antennas. Persons skilled in the art will recognize that the measurement beam has a pattern comprising the product of the associated transmit and receive patterns, and the measurement beam pattern may be changed by modifying either or both.

The number of resulting measurement beams may be greater than or equal to the number of transmit or receive beams. For example, combining 2 transmit beams, angularly selective in elevation, with 3 receive beams, angularly selective in azimuth, may yield 6 distinguishable measurement beams.

Figure 2:
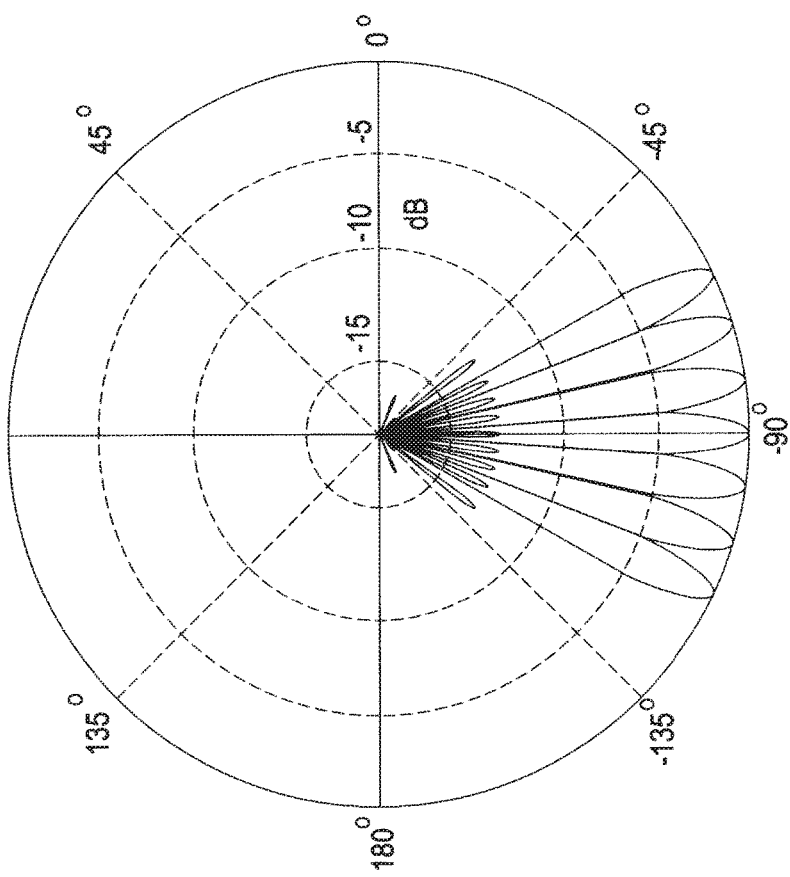
FIG. 2 illustrates an example beam array provided by an antenna array.

A flow meter, e.g., 101, may utilize a plurality of fixed antenna elements, for example arranged as a linear or planar array. Such arrangements may be used for a transmitting antenna, a receiving antenna, or both. By way of non-limiting example, and referring to FIG. 2, the transmit antennas may be provided in an array, e.g., a fixed linear array, such that the resulting measurement beams cover (are reflected from) the surface of the fluid 103 in distinct areas. FIG. 2 illustrates an example of the azimuthal pattern (power vs. angle) for 7 distinct measurement beams produced using an antenna array having 13 elements spaced at 7.5 mm.

Figure 3:
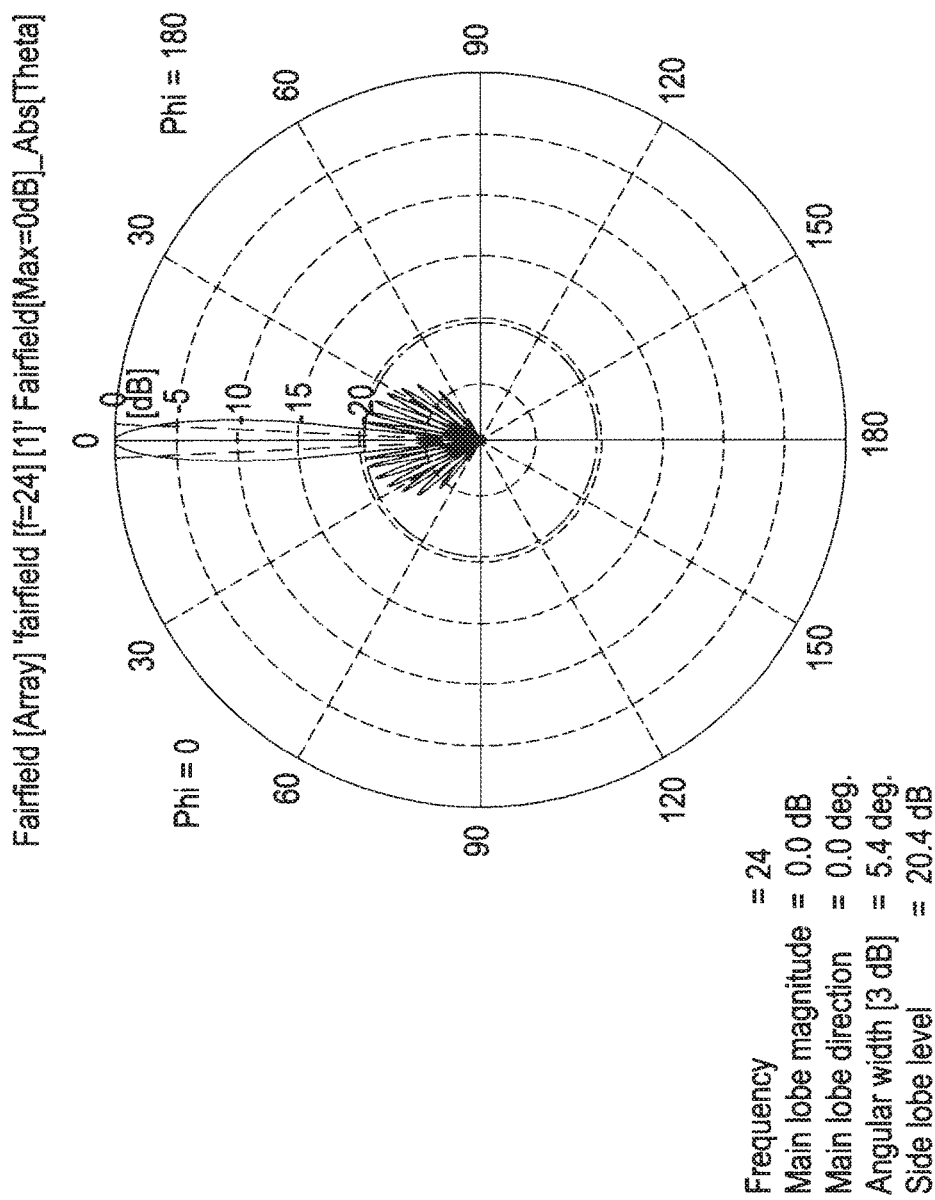
FIG. 3 illustrates an example of a single broadside-steered beam provided by an antenna array.
Figure 4:
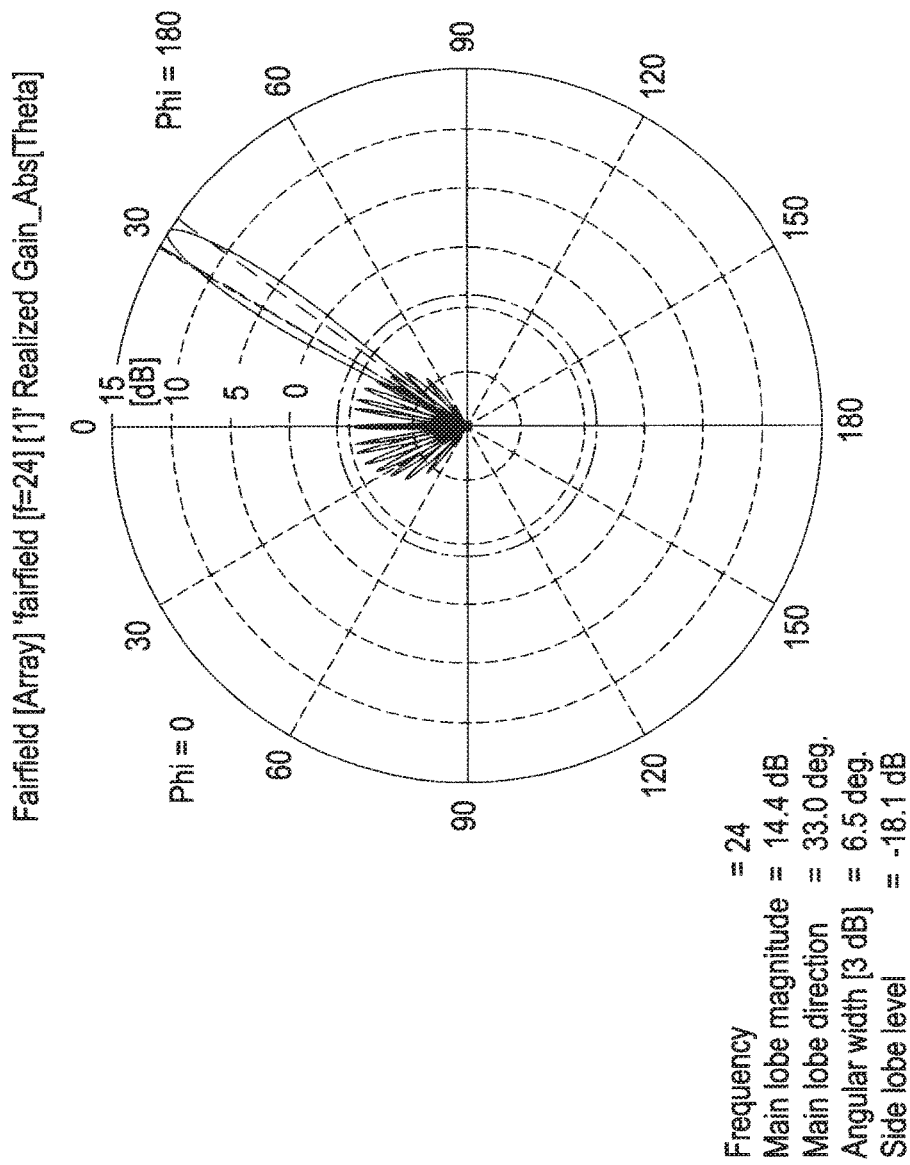
FIG. 4 illustrates an example of a differently-steered beam provided by an antenna array.

FIG. 3 and FIG. 4 illustrate examples of azimuthal patterns for measurement beams according to an embodiment. FIG. 3 illustrates a simulated 24 GHz antenna beam with a 5.4° (width), 0° (direction) main measurement beam with −20.4 dB side lobe suppression. FIG. 4 illustrates a simulated 24 GHz antenna beam with 6.5° width, +33° bore sight direction and −18.1 dB side lobe suppression. In an embodiment, a flow meter 101 has selectable beam orientations of 0°, +/−32°, with the orientation angle being selectable, e.g., at 5° increments. Moreover, in an embodiment, the flow meter 101 has a null-to-null azimuthal beam width from 5.5°, +/−2.75°, up to 64°, +/−32°, and is therefore capable of spanning either a partial width of the channel or substantially the entire width of the channel, depending on the particular channel.

One method of controlling beam direction involves applying progressive phase or time delays to the elements of a phased-array antenna. Those skilled in relevant art will recognize that there exist a variety of ways of steering or switching among distinctly-steered measurement beams and the scope of the described embodiments defined by claims should not be limited by which particular method is used, unless explicitly stated in one or more of the claims.

In the examples of FIGS. 2-4, the elements of an array may be controlled to produce the measurement beams indicated. This provides, for a receiving antenna located in (or in operative connection with) a fluid flow meter 101, a plurality of measurements of the surface velocity of the fluid 103, e.g., as illustrated in FIGS. 2-4. Note that more or fewer transmission beams may be utilized.

A non-contact fluid velocity sensor may be disposed in a fluid flow meter 101 for use in open channels, e.g., as illustrated in FIG. 1. The non-contact fluid velocity sensor is capable of measuring surface velocity at a multiplicity of locations substantially spanning the channel's width. The non-contact fluid velocity sensor may employ one or more electromagnetic beams, e.g., the sensor may employ a radar-based beam system for Doppler surface velocity determination. It is noted that the non-contact fluid velocity sensor may employ other techniques, e.g., one or more ultrasonic beams.

A radar system employed by a flow meter such as meter 101 may include measurement beam(s) utilizing vertical electromagnetic polarization and designed for a beam angle of between about 20 and about 50 degrees above the fluid surface 103, where about 35 degrees is the most-preferred angle for optimizing the Doppler signal strength as a fraction of carrier leakage, but 45 degrees may be employed to reduce the path length and required transmit power.

Meter electronics, further described herein, may use at least two surface velocities measurements from the fluid to estimate a parameter of an open channel flow velocity model. By way of example, the meter electronics may contain a memory that stores an application containing therein an open channel flow velocity model, where the application permits fluid flow to be estimated given input surface velocity measurements from a plurality of surface locations. In an embodiment, any one of, or several of, the following analysis techniques may be used to apply these measured surface velocities to useful purposes.

By way of example, the individual surface velocity measurements may be used directly in a multi-dimensional equation or table to determine the cross-sectional average velocity. The multi-dimensional equation or table may be derived according to theoretical precepts, empirical studies, or some combination thereof. In an embodiment, such data may be contained on board in a memory of a flow meter such as flow meter 101, or may be accessed by way of wired or wireless communication between the flow meter and another device.

In addition, or in the alternative, measured surface velocities may be used to fit a parametric velocity model describing velocities across the entire channel cross-section. The fitted model may then be used to compute the required average velocity.

In addition, or in the alternative, measured surface velocities may be used to fit a low-order parametric model of the surface velocity distribution, for instance a quasi-parabolic model parameterized by central velocity, width, and skew. The resulting simplified surface distribution may then be used to estimate cross-sectional average velocity according to some theoretical model or empirically-derived calibration rule.

In addition, or in the alternative, the measured surface velocities may be used to infer relevant physical characteristics of the channel, for instance the surface roughness of one or more channel boundaries or one or more boundary shear values.

In addition, or in the alternative, the surface velocity measurements may be compared to a library of computer simulation results to determine which simulation best matches the observed surface velocity data and the cross-sectional average velocity may be inferred by re-scaling the average velocity from the chosen simulation.

In applying any of these methods, enumerated by way of example, a time-averaged or smoothed version of the surface velocity measurements may be utilized.

In an embodiment, transmit or receive beams used by a flow meter, e.g., flow meter 101 of FIG. 1, may be adapted or changed based on the fluid 103 level within a channel or based on the distance between the flow meter 101 and the fluid surface 103, e.g., based on an altimeter reading used for example in a UAV implementation. By way of example, for open channels, such as the fluid channel illustrated in FIG.

1, the number of locations measured may vary with the channel's fluid fill level, the channel's width, and/or the distance between the flow meter 101 and the fluid surface 103. An example embodiment thus modulates, changes or adjusts the beam(s) based on the foregoing parameter(s).

Figure 5:
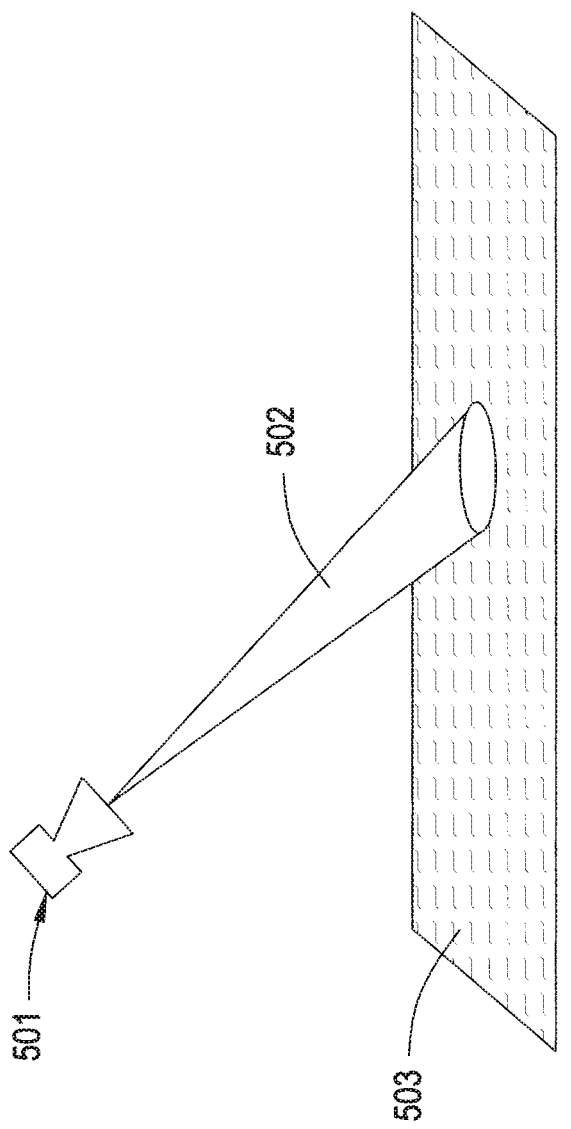
FIG. 5 illustrates a beam surface characteristic.

As illustrated in FIG. 5, most flow meters, e.g., 501, include a transducer, whether electromagnetic or acoustic, to produce a beam 502 whose shape can be approximated as circular or flattened cone having its apex at the transducer. This cone, projected on the fluid surface 503, produces a measurement patch whose shape may be circular, ovaloid, or teardrop-shaped.

If the distance between the flow meter 501 transducer and the fluid surface 503 is variable, then the measurement patch size will change as well. Cases are encountered in which large variations of the distance between the flow meter 501 transducer and the fluid surface 503 are possible. At some time, the fluid surface 503 is quite close to the flow meter 501, while in other cases it is much farther away.

These facts and situations create a potential need to modify the beam pattern in order to maintain an acceptably-sized measurement patch as the distance between the flow meter 501 transducer and the fluid surface 503 changes. The particular distance at which such modification should be made may depend also on site and installation specifics, such as channel shape and instrument mounting location.

Alternatively, the beam may be adapted with distance changes, so as to hold the ratio of the beam's projected width to the fluid surface width constant. This may require an adaptation rule specific to the channel shape, as the fluid surface width modulates differently based on the fill level and fluid channel shape.

Beam directivity is primarily governed by the square of the transducer size relative to the wavelength of the transmitted or received energy. This statement is true when the beam pattern is observed in the far field region beyond some minimum distance from the transducer. In simple cases, the far field boundary distance is given by $2D^2/\lambda$, where D is the span of the transducer face and $\lambda$ is the wavelength of the transmitted or received energy. A transducer employed at ranges less than the far field boundary distance may exhibit degradation of its intended beam pattern, for instance higher side lobe levels. If a transducer is to be used at short ranges, it may be desirable to employ a less-directional (smaller) design, in order to shorten the far field distance. However, if the transducer must also be used at longer ranges, compromising its directivity may be undesirable because it will result in an excessively large measurement patch. Some implementations exhibit wide variation in the range between transducer and fluid surface. Thus, there is a potential need to modify the transducer's effective size as the range changes. The range at which this problem manifests will depend on site and implementation specifics, such as channel shape and instrument location.

A characteristic of fluid flow measurement instruments (apart from the type of beam energy employed) is that some use monostatic transducers, while others use bistatic transducers. Monstatic transducers both transmit and receive using the same transducer, while a bistatic transducer instrument uses distinct transducers for transmit and receive. Some instruments are capable of operating in continuous-wave modes, characterized by uninterrupted operation of the transmit transducer over the complete measurement period. Some instruments are not capable of continuous-wave modes because the transmission must usually be stopped, and the transducer repurposed for reception, before the return energy reflected from the water surface arrives. Thus, some instruments may suffer from a time lag defined as the minimum time interval required for repurposing the transducer. In systems intended for ranging, such as a down-looking ultrasonic level sensor, this manifests as a minimum target range at which the sensor can function. While some instruments have no lag time, they potentially suffer from parallax errors caused by transmit and receive transducers being aimed at different locations on the fluid surface.

If the fluid surface is fixed at a known distance, no difficulty arises in aiming both the transmit and receive transducers at the same point. But some installation sites will exhibit large variability in the fluid-to-transducer distance. For example, in a fluid channel the distance may vary greatly based on changing fill levels or based on mounting of the flow meter on an UAV or other mobile platform. In these situations, and particularly with narrow beam widths, it may happen that no single orientation of transmit and receive transducers will work at all distances. This creates a need reorient the beam axis of one transducer with respect to the other as the distance changes. The distance at which a beam reorientation is needed will depend on site and installation specifics such as channel shape and instrument location.

As the width of the fluid surface may vary, there is a need to adapt the beam orientation or active beam count. This may be done by changing the orientation of a single beam or by switching between several beams having different orientations.

Figure 6:
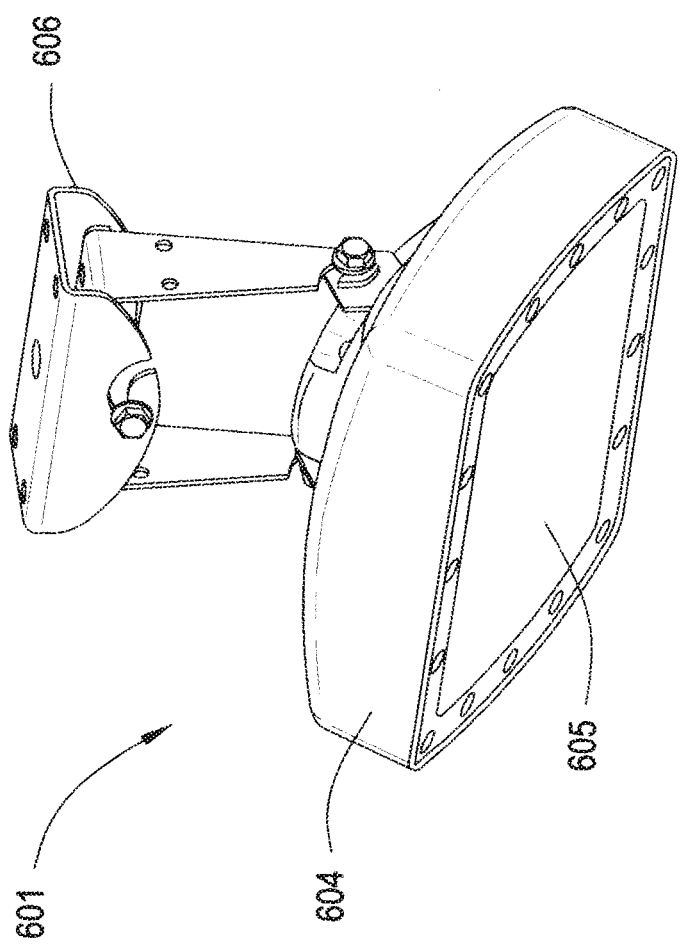
FIG. 6 illustrates an example fluid flow meter.

FIG. 6 illustrates a view of an example flow meter 601 according to an embodiment. As illustrated, the flow meter 601 includes a housing 604 that encases the internal components (described in further detail in connection with FIG. 7). The antenna (not illustrated in FIG. 6) transmits and receives measurement beams and is enclosed by a radome 605. The flow meter 601 is small, e.g., the sensor dimensions in an embodiment do not exceed 27 cm×20 cm×12 cm, and as such the flow meter 601 may be mounted to many different locations or may be deployed using a UAV, e.g., via attachment using mounting bracket 606.

An embodiment provides a compact mm-wave phased-array radar suitable for use above a river or stream. The flow meter 601 is capable of making Doppler velocity measurements at a multiplicity of spatially distinct points spanning a significant portion of a water channel. One or more beam characteristics (e.g. beam azimuth, beam count, or beam width) are adjusted in response to flow conditions, height of the flow meter 601, or a combination of the foregoing.

In an embodiment, the radar carrier frequency is approximately 24 GHz and 12 or more beam orientations may be measured simultaneously. Azimuthal beam widths are adjustable between +/−5.5 degrees and +/−32 degrees. In an embodiment, the flow meter 601 weight does not exceed 3 kg. The sensor incorporates automatic tilt compensation.

In an embodiment, the adjustment of one or more beam characteristics is done automatically in response to one or more measured return signal parameters such as Doppler shift, signal strength, or signal variability. Additionally, an embodiment may adjust or change beam characteristics based on the height above the fluid surface. In a multi-beam radar velocity sensor according to an embodiment, the flow meter 601 is configured for mounting on a UAV and adjusts one or more beam characteristics in accordance with data reported from a real time altimeter or vertical distance sensor and/or in accordance with signal parameters such as such as Doppler shift, signal strength, or signal variability.

Figure 7:
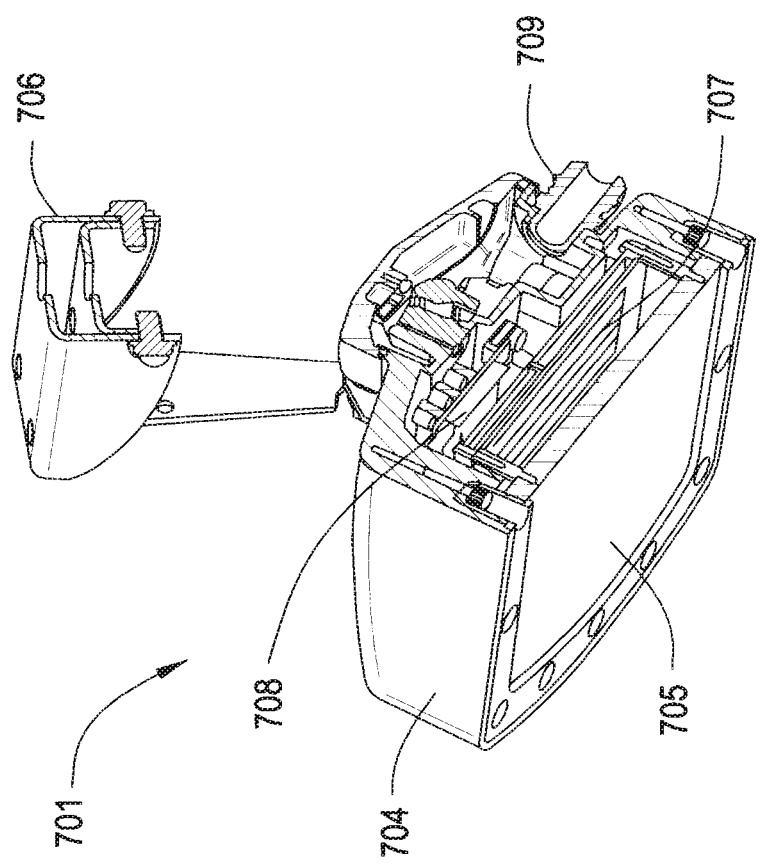
FIG. 7 illustrates an example fluid flow meter.

FIG. 7 illustrates a cross section of a flow meter 701 according to an embodiment. Here, the internal components of the flow meter 701 are visible. Again, internal components are contained within an outer housing 704, which may be mounted on a structure such as a bridge or mobile vehicle using a bracket mount 706. An antenna array 707 provides for measurement beam (transmission and reception) through radome 705. The measurement beam provides data that is communicated, e.g., using a communications board 708, for processing, e.g., by a remotely located processor connected via a cable connection 709.

The beam(s) used may be transmitted or received using monostatic and/or bistatic type transducers, e.g., as for example provided by antenna 707, whose beam characteristics are modified in accordance with distance between the antenna 707 and the fluid surface or other parameter of interest, e.g., fluid fill level. The characteristics to be modified may be the beam pattern or size, the beam orientation or aim, the number of active beams, or a suitable combination of the foregoing. These modifications may be achieved in one or more of the following ways, i.e., by changing the active area of the transducer so as to widen or narrow the beam width, by enabling, disabling, or changing the relative weighting of selected elements in an array-type transducer, by changing the relative phases or feed delays of various elements in an array-type transducer, by changing beam frequency or wavelength, by adjusting lenses or mirrors, and/or by switching among two or more transducers having different characteristics. Also, the characteristics of an effective measurement beam may be modified by changing the constituent transmit beam, receive beam, or both.

By way of non-limiting example, for transmission, there may be one series-fed tapered vertical patch array, whose pattern is azimuthally broad and illuminates everything in an area of interest. The receive array may consist of a plurality (e.g., 16) similar tapered vertical arrays, with each column having its own receive electronics. This allows DSP-based adaptation of the azimuthal beam characteristics (width and direction).

An embodiment therefore determines (by any means) the separation distance, i.e., a value representative of the separation between the fluid surface and the measurement instrument (or relevant component thereof). An embodiment then calculates the cross-sectional flow area and width of water surface. The measurement beam characteristics may then be adapted to the water surface width, as required, e.g., based on a different fluid level and/or a different position of the instrument, for example when the instrument is repositioned or is a mobile instrument. The instrument transmits and receives measurement beams, thereby obtaining several patch velocities, which an embodiment uses to calculate an estimated mean velocity (based on patch velocities, water height, and channel cross-section). This permits an embodiment to compute volumetric flow as mean velocity times cross sectional area. These steps may be repeated, e.g., at some later time.

Figure 8A:
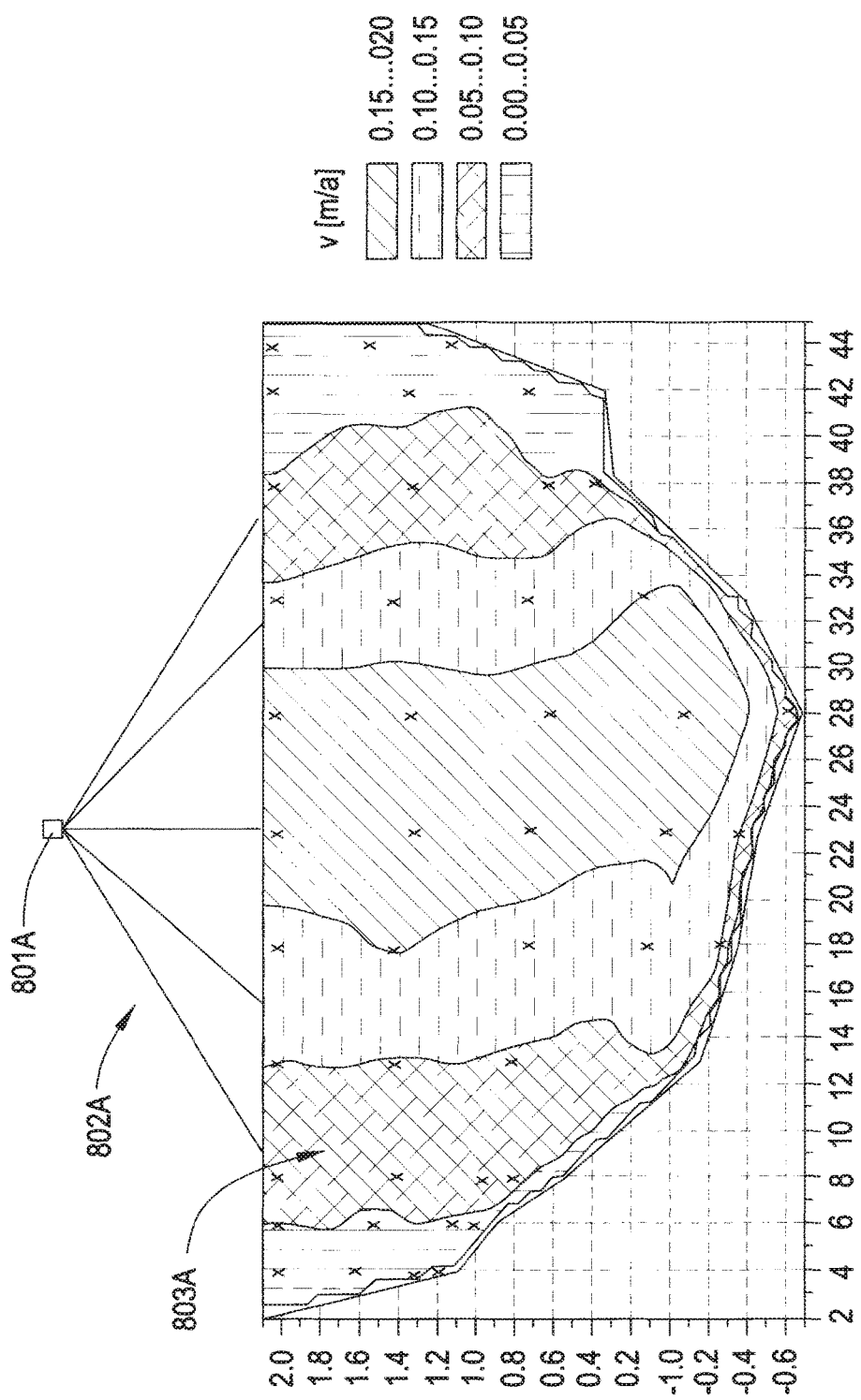
FIG. 8(A-B) illustrates examples of symmetric and asymmetric velocity profiles for an open channel.
Figure 8B:
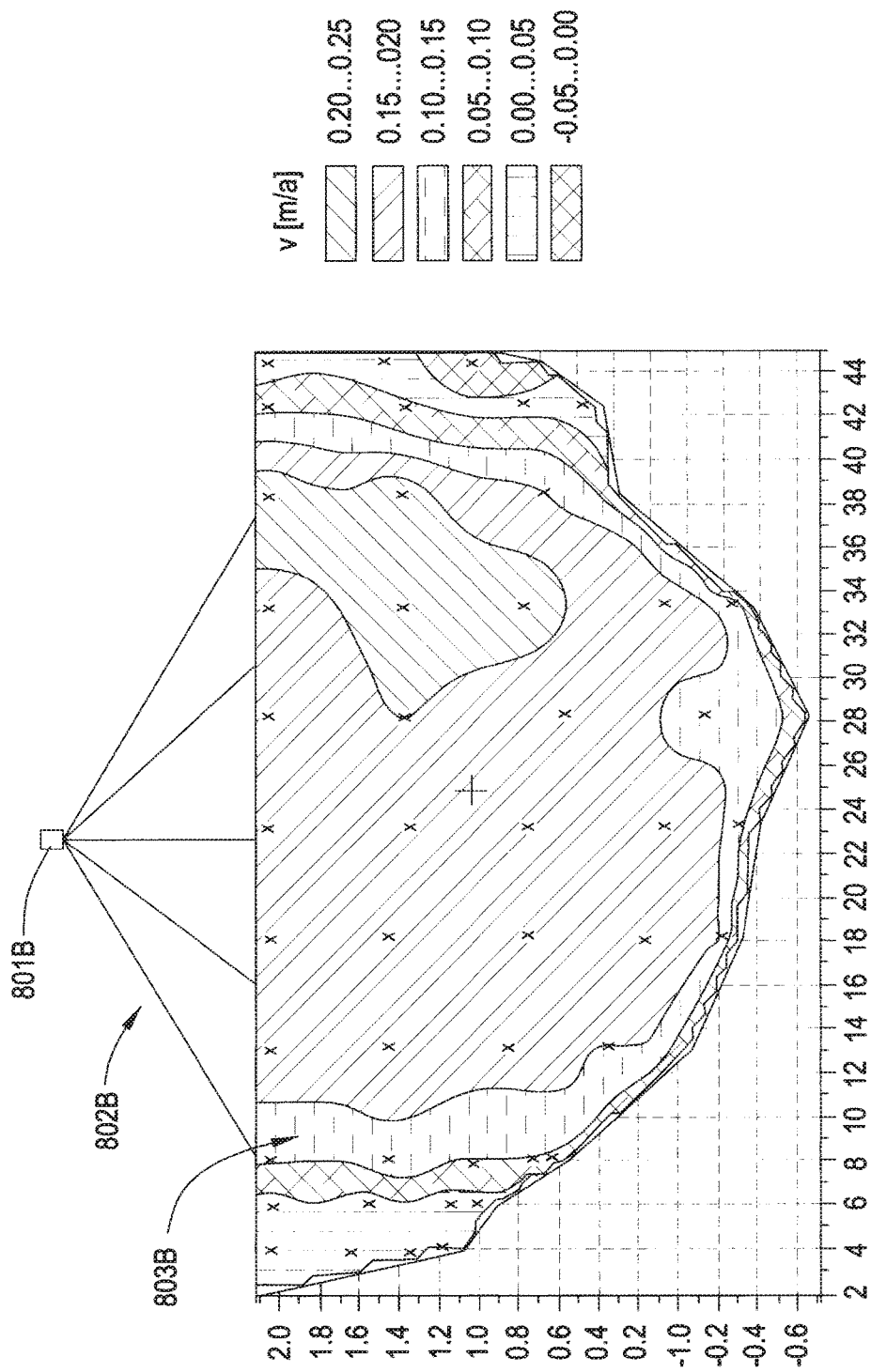

Turning to FIG. 8(A-B), an open channel may have a symmetric or asymmetric flow in terms of velocity distribution. FIG. 8A illustrates an example of a symmetric velocity distribution, whereas FIG. 8B illustrates an example of an asymmetric velocity distribution.

An embodiment employs a flow meter 801a that uses a set of measurement beams (collectively indicated at 802a) spanning a significant portion of the fluid channel. For example, a flow meter 801a mounted on a bridge may transmit an azimutally wide (x axis, meters), elevationally narrow (y axis, degrees) beam at an acute angle towards the fluid surface 803a, e.g., river water, etc. With the transmit beam spanning substantially the entire water surface 803a, a plurality of receive beams, elevationally wide and azimuthally narrow, may be employed to measure velocities within a corresponding plurality of localized surface patches—spanning some significant portion of the width of the channel. These patches result from the fact that the effective measurement beams, being the product of transmit and receive beams, are narrow in both elevation and azimuth.

For example, in an embodiment a plurality of (e.g., five or more) beam reflections 802a that are spaced, e.g., at regular angles from a center of the channel, may be received by a corresponding plurality of measurement beams. The spacing of the angles may be such that a substantial width of the water surface 803a is measured, e.g., at regular increments (such as every 12 degrees (referring to FIG. 8(A-B) for example)). This spacing provides an adequate sampling in many instances to calculate a more accurate mean surface velocity for the fluid flowing through the channel as compared to a single, centrally located measurement. Moreover, by utilizing a plurality of measurement beams, the area of the open channel having the maximal velocity may be automatically identified.

By way of specific example, if only a centrally located measurement beam were utilized to calculate flow, this may be permissible for a symmetric velocity distribution where a maximum velocity is centrally located, as illustrated in FIG. 8A. However, for an asymmetric velocity distribution, for example as illustrated in FIG. 8B, a centrally located measurement beam will not detect the highest velocity present within the open channel. Thus, a flow meter 801b according to an embodiment utilizes a plurality of measurement beams 802b in order to detect a corresponding plurality of surface velocities, i.e., by measuring different areas on the fluid surface 803b, simultaneously and/or in serial fashion.

Figure 9:
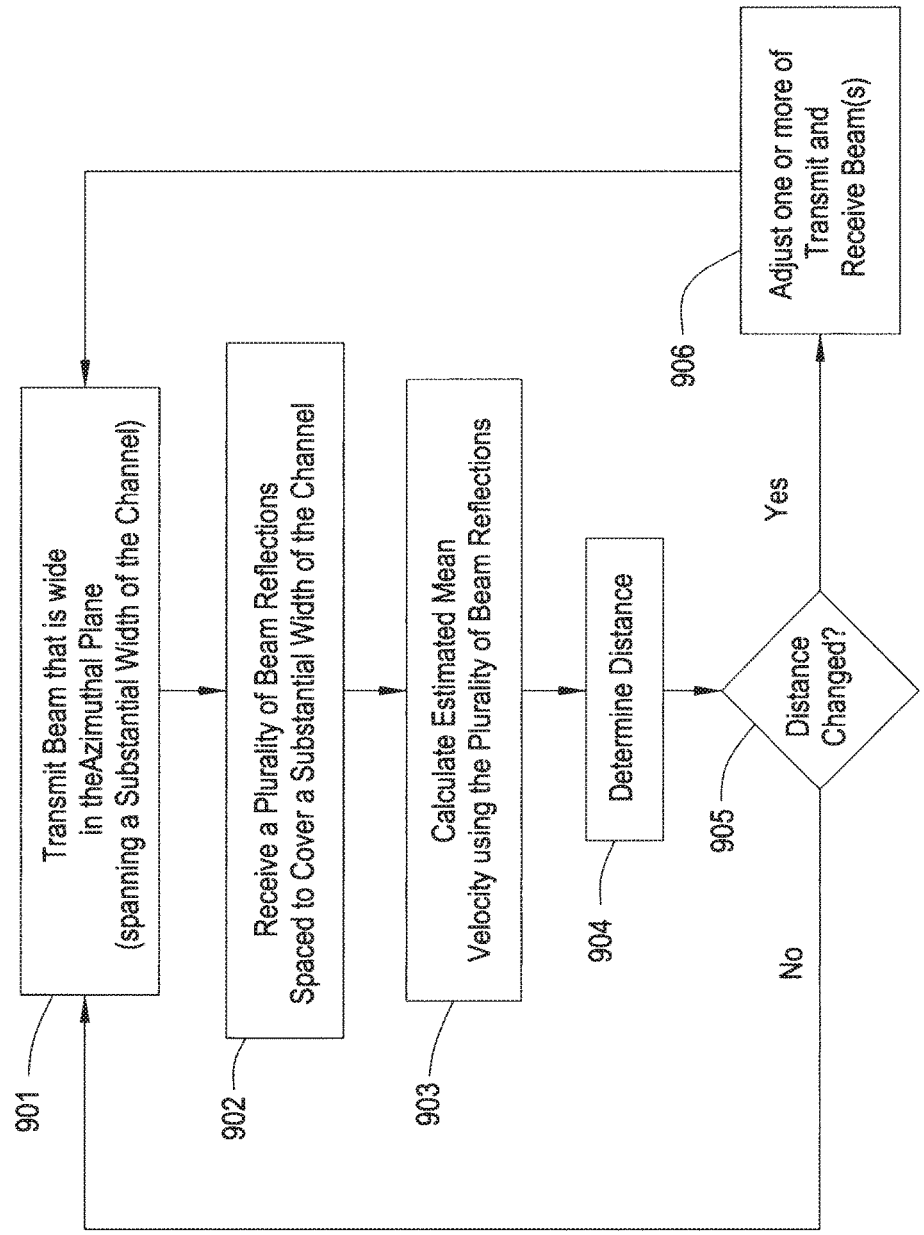
FIG. 9 outlines an example method of flow metering.

Referring to FIG. 9, an embodiment can thus use the plurality of fluid surface velocity measurements 901, 902 to calculate an estimated mean surface velocity at 903. Such mean surface velocity may be converted into other useful measurements, e.g., mean fluid flow velocity and thence volumetric flow rate.

As described herein, an embodiment can adapt the transmit beam(s) and/or received beam(s) based on the distance between the fluid surface and the flow meter. Thus, an embodiment may determine a distance between the fluid surface in an open channel and the flow meter at 904. A variety of techniques may be utilized to determine the current distance at 904. For example, the distance may be known from an initial measurement provided to the fluid flow meter and later updated (periodically, intermittently, etc.) based on a level values sensed using, e.g., a down-looking ultrasonic or microwave level measurement device, using an altimeter, etc.

If the distance has changed, e.g., by at least a predetermined amount, an embodiment may adjust one or more of the transmit and receive beam(s) at 906, i.e., prior to obtaining updated fluid surface velocity measurements. Thus, an embodiment may adjust the width of the surface being covered by a beam or beams such that an appropriate coverage is achieved for a given distance.

Figure 10:
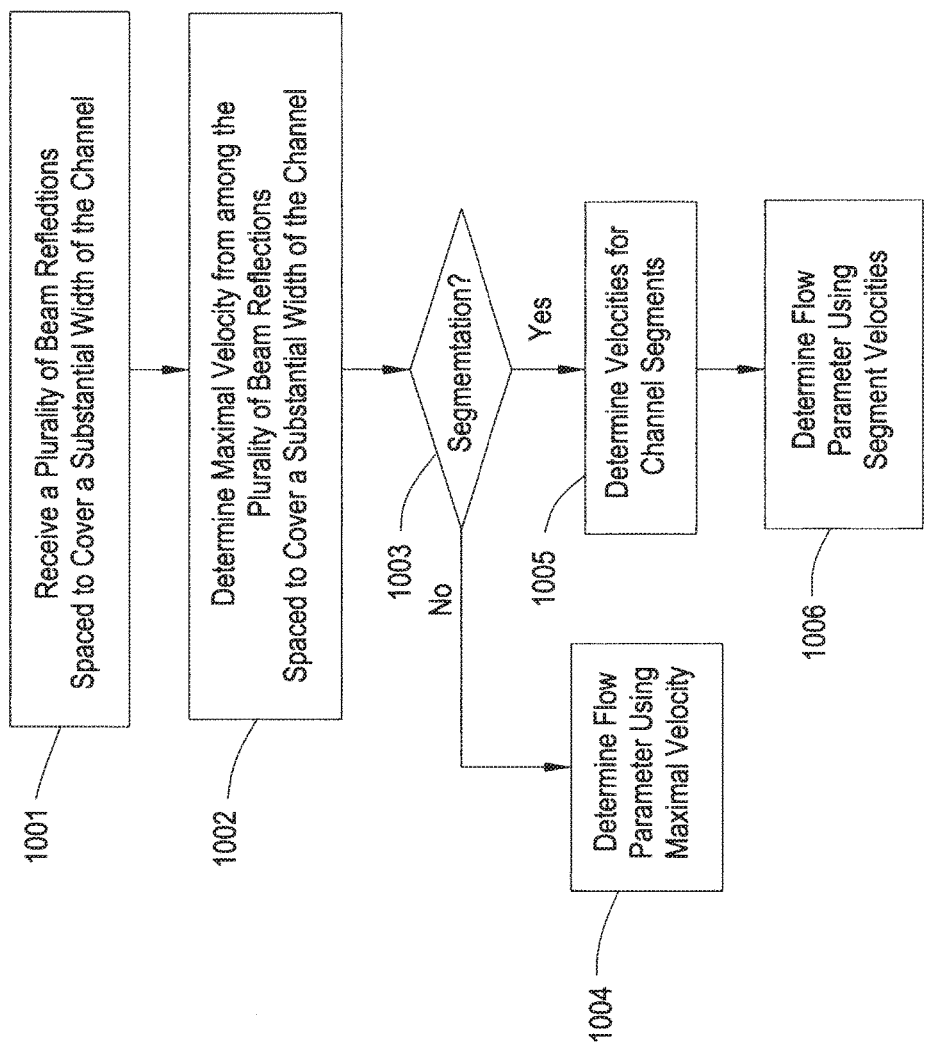
FIG. 10 outlines an example method of flow parameter estimation.

Having a plurality of fluid surface velocities, an embodiment may utilize these to apply entropic flow modeling theory. By way of example, and referring to FIG. 10, an embodiment receives a plurality of beam reflections at 1001. From among the plurality of surface velocities, an embodiment determines the maximum velocity at 1002. This maximal velocity is generally measurable at the water surface near the center of the channel, but variations in channel shape may cause it to move off-center, as shown in FIG. 8A.

Thus, an embodiment employs a flow meter that utilizes a sufficiently wide measurement beam or a plurality of measurement beams to characterize the surface velocity over a significant fraction of the open channel's width. This initial characterization can be repeated over time, e.g., to aim a main measurement beam properly as the maximal surface velocity profile changes, as illustrated in FIG. 8(A-B). Such changes may occur for example during a flood event.

With a more accurate determination of the maximal velocity, as obtained at 1002, an embodiment may determine a flow parameter at 1004, e.g., volumetric flow, using a variety of techniques. Furthermore, having a plurality of surface velocities available permits an embodiment to implement segmentation techniques, e.g., such as segmented entropic flow theory.

For example, in an embodiment employing a segmented entropic flow there, as determined at 1003, the plurality of beam reflections may be utilized to determine velocities for channel segments, as illustrated at 1005. This in turn permits determination of a flow parameter of interest, e.g., estimated fluid flow for the open channel, as illustrated at 1006.

An embodiment may be implemented on a wide variety of devices. Examples of suitable devices may include a flow meter that includes an antenna array operated according to program instructions for providing a plurality of fluid surface velocity measurement points and/or a beam or beams that vary in terms of the width of the fluid surface measured, e.g., based on the distance between the fluid surface and the flow meter. In an embodiment, a flow meter may include a computing device having a processor and a memory, where the processor executes instructions of a fluid surface velocity measurement program. As described herein, the memory may contain a table, model, or a combination thereof in order to use the measured surface velocity or velocities to compute an estimated fluid flow volume or rate.

Figure 11:
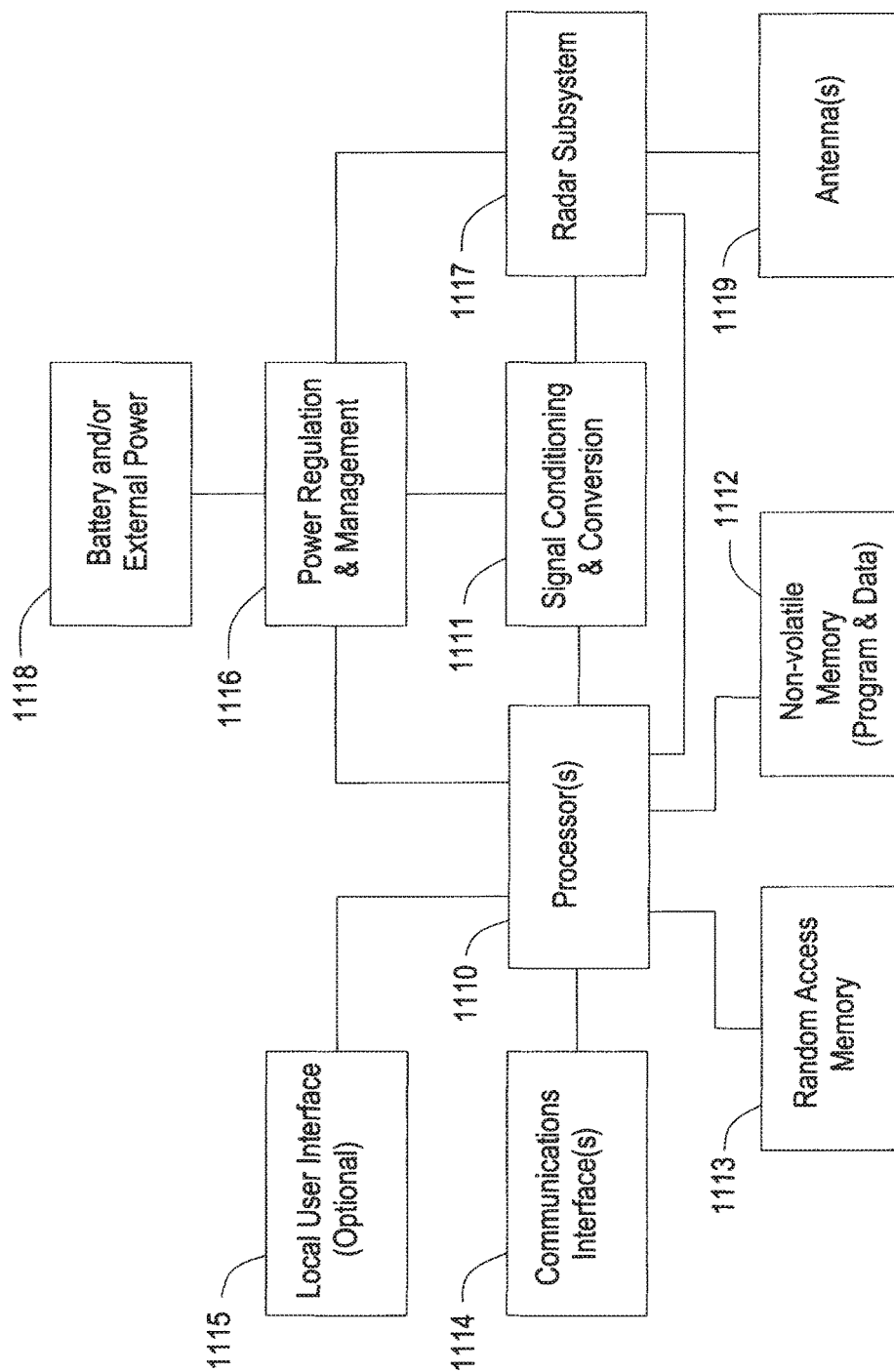
FIG. 11 illustrates an example of the various subsystems within a typical sensor as described herein.

While various other circuits, circuitry or components may be utilized in such devices, with regard to an instrument for measuring a fluid parameter according to any one of the various embodiments described herein, an example is illustrated in FIG. 11. In some systems, one or more processor(s) 1110 are operatively coupled to certain peripherals, e.g., including signal conditioning and conversion unit 1111, memory 1112, 1113, communications interface 1114, user interface 1115, power regulation and management unit 1116, and radar subsystem 1117.

The power regulation and management unit 1116 may be powered by a rechargeable battery 1118, which may be recharged by a connection to a power source (not shown).

Additionally, peripheral devices 1119 may be included, e.g., an antenna array, as further described herein. A system often includes a user interface 1115 for data input and display/rendering. A system also typically includes various memory devices, 1112, 1113, e.g., for storing measurements reported by the antenna array 1119, for storing models or tables, etc., as further described herein.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data.

Embodiments may be implemented as a system, method or program product. Accordingly, an embodiment may take the form of an entirely hardware embodiment, or an embodiment including software (including firmware, resident software, micro-code, etc.) that may all generally be referred to herein as a "circuit," "module" or "system." Furthermore, embodiments may take the form of a program product embodied in at least one device readable medium having device readable program code embodied thereon.

A combination of device readable storage medium(s) may be utilized. In the context of this document, a device readable storage medium ("storage medium") may be any tangible, non-signal medium that can contain or store a program comprised of program code configured for use by or in connection with an instruction execution system, apparatus, or device. For the purpose of this disclosure, a storage medium or device is to be construed as non-transitory, i.e., not inclusive of signals or propagating media.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring a fluid parameter of fluid flowing in a channel, comprising:
   transmitting, using a transmitter of a device positioned above a fluid channel, directed energy carrying a signal toward a surface of a fluid in the fluid channel, so as to produce one or more reflections from the fluid surface, wherein locations of the produced one or more reflections substantially span the width of the fluid channel;
   detecting, by at least one receiver of the device, one or more received signals associated with the one or more reflections so produced;
   determining, based upon a measurement beam comprising characteristics of the transmitted and received signals, one or more fluid parameters to be measured using a processor of the device; and
   associating, using a processor of the device, the one or more fluid parameters with a channel segment.

2. The method of claim 1, wherein the one or more fluid parameters comprise a plurality of fluid parameters.

3. The method of claim 2, wherein each of the plurality of fluid parameters is associated with at least one channel segment.

4. The method of claim 3, wherein the plurality of fluid parameters is used to determine a location of maximal surface velocity within the channel.

5. The method of claim 3, wherein the plurality of fluid parameters is used to determine a channel flow rate.

6. The method of claim 1, wherein a single fluid parameter is used to determine channel flow rate.

7. The method of claim 1, wherein, a measurement beam characteristic is adjusted based on a distance from the device to the fluid surface.

8. The method of claim 7, wherein said measurement beam characteristic adjusted comprises a width of the channel measured by at least one measurement beam.

9. The method of claim 8, wherein a number of measurement beams is increased based on the distance from the device to the fluid surface increasing.

10. The method of claim 1, wherein the device comprises an unmanned aerial vehicle.

11. A device for measuring a fluid parameter of fluid flow in a channel, comprising:
the device being positioned above a fluid channel;
a transmitter;
at least one receiver;
a processor operatively coupled to the at least one transmitter and the at least one receiver;
a memory device that stores instructions executable by the processor to:
transmit, using the transmitter, directed energy carrying a signal toward a surface of a fluid in the fluid channel, so as to produce one or more reflections from the fluid surface, wherein locations of the produced one or more reflections substantially span the width of the fluid channel;
detect, by the at least one receiver, one or more received signals associated with the one or more reflections so produced;
determine, based upon a measurement beam comprising characteristics of the transmitted and received signals, one or more fluid parameters to be measured using a processor of the device; and
associate, using a processor of the device, the one or more fluid parameters with a channel segment.

12. The device of claim 11, wherein the one or more fluid parameters comprise a plurality of fluid parameters.

13. The device of claim 12, wherein each of the plurality of fluid parameters is associated with at least one channel segment.

14. The device of claim 13, wherein the plurality of fluid parameters is used to determine a location of maximal surface velocity within the channel.

15. The device of claim 13, wherein the plurality of fluid parameters is used to determine a channel flow rate.

16. The device of claim 11, wherein a single fluid parameter is used to determine channel flow rate.

17. The device of claim 11, wherein, a measurement beam characteristic is adjusted based on a distance from the device to the fluid surface.

18. The device of claim 17, wherein said measurement beam characteristic adjusted comprises a width of the channel measured by at least one measurement beam.

19. The device of claim 18, wherein a number of measurement beams is increased based on the distance from the device to the fluid surface increasing.

20. The device of claim 11, wherein the device comprises an unmanned aerial vehicle.

21. A product for measuring velocity of fluid flow in a channel, comprising:
a non-transitory storage device having code stored therewith, the code being executable by a processor and comprising:
code that transmits, using a transmitter of a device positioned above a fluid channel, directed energy carrying a signal toward a surface of a fluid in the fluid channel, so as to produce one or more reflections from the fluid surface, wherein locations of the produced one or more reflections substantially span the width of the fluid channel;
code that detects, by at least one receiver, one or more received signals associated with the one or more reflections so produced;
code that determines, based upon a measurement beam comprising characteristics of the transmitted and received signals, one or more fluid parameters to be measured using a processor of a device; and
code that associates, using a processor of the device, the one or more fluid parameters with a channel segment.

* * * * *